US011042792B2

(12) United States Patent
Pic et al.

(10) Patent No.: US 11,042,792 B2
(45) Date of Patent: Jun. 22, 2021

(54) METHODS FOR ENCODING A SOURCE COLOR ILLUSTRATION, FOR AUTHENTICATING AN ILLUSTRATION, AND RELATED COMPUTER MEDIA

(71) Applicant: SURYS, Marne la Vallee (FR)

(72) Inventors: Marc Pic, Boulogne Billancourt (FR); Mohammed Amine Ouddan, Le Perreux sur Marne (FR); Hugues Souparis, Paris (FR)

(73) Assignee: SURYS, Marne la Vallee (FR)

( * ) Notice: Subject to any disclaimer, the term of this patent is extended or adjusted under 35 U.S.C. 154(b) by 0 days.

(21) Appl. No.: 16/633,733

(22) PCT Filed: Jul. 12, 2018

(86) PCT No.: PCT/FR2018/051761
§ 371 (c)(1),
(2) Date: Jan. 24, 2020

(87) PCT Pub. No.: WO2019/020893
PCT Pub. Date: Jan. 31, 2019

(65) Prior Publication Data
US 2020/0210795 A1    Jul. 2, 2020

(30) Foreign Application Priority Data

Jul. 24, 2017   (FR) ...................................... 1757021

(51) Int. Cl.
*G06K 19/00*    (2006.01)
*G06K 19/06*    (2006.01)
(Continued)

(52) U.S. Cl.
CPC ....... *G06K 19/06103* (2013.01); *G06F 21/36* (2013.01); *G06K 19/06028* (2013.01); *H04L 9/3247* (2013.01)

(58) Field of Classification Search
CPC ........ G06K 19/06103; G06K 19/06028; G06F 21/36; H04L 9/3247
See application file for complete search history.

(56) References Cited

U.S. PATENT DOCUMENTS

| 2014/0267369 A1 | 9/2014 | Mesh-Iliescu et al. |
| 2015/0332136 A1 | 11/2015 | Nosaka |

(Continued)

FOREIGN PATENT DOCUMENTS

| DE | 2759270 A1 | 7/1979 |
| EP | 2526531 A1 | 11/2012 |

(Continued)

OTHER PUBLICATIONS

English Translation of the International Preliminary Report on Patentability for International Application No. PCT/FR2018/051761, completed Oct. 10, 2019, 5 pages.

(Continued)

*Primary Examiner* — Pakee Fang
(74) *Attorney, Agent, or Firm* — TraskBritt (57) ABSTRACT

The disclosure relates to a method for encoding an illustration, which involves writing the illustration in greyscale or in color, encoding a message in the form of a two-dimensional barcode comprising a set of blocks, each block encoding a fragment of the message and comprising a set of (M) rows and (N) columns, and each block comprising a set of encoding sub-blocks, each subblock comprising a set of bits. It is essentially characterized in that the encoding step comprises defining or identifying a set of remarkable points on the source illustration, calculating a set of attributes according to certain remarkable points, selecting, among the set of attributes, at least one attribute making it possible to define a digital fingerprint, optionally compressed, optionally sign the digital fingerprint, record in the message one of at least one attribute, the digital fingerprint, optionally (Continued)

compressed, the signed digital fingerprint in compressed or non-compressed form.

19 Claims, 4 Drawing Sheets

(51) Int. Cl.
  *H04L 9/32* (2006.01)
  *G06F 21/36* (2013.01)

(56) References Cited

U.S. PATENT DOCUMENTS

| | | | |
|---|---|---|---|
| 2015/0347889 A1* | 12/2015 | Nosaka | G06K 7/1439 726/7 |
| 2016/0342874 A1 | 11/2016 | Powell et al. | |
| 2019/0354822 A1 | 11/2019 | Pic et al. | |

FOREIGN PATENT DOCUMENTS

| | | | |
|---|---|---|---|
| EP | 2581860 A1 | 4/2013 | |
| EP | 2743893 A1 | 6/2014 | |
| EP | 2937819 A1 | 10/2015 | |
| WO | WO-2014090804 A1 * | 6/2014 | G07D 7/0047 |

OTHER PUBLICATIONS

Arguments for an International Preliminary Examination for International Application No. PCT/FR2018/051761, dated Apr. 4, 2019, 5 pages (including English machine translation).

Arguments for an International Preliminary Examination for International Application No. PCT/FR2018/051761, dated Sep. 23, 2019, 5 pages (including English machine translation).

International Preliminary Report on Patentability for International Application No. PCT/FR2018/051761, completed Oct. 10, 2019, 16 pages (including English machine translation).

International Search Report for International Application No. PCT/FR2018/051761, dated Sep. 20, 2018, 9 pages (including English translation).

International Written Opinion for International Application No. PCT/FR2018/051761, dated Sep. 20, 2018, 8 pages (including English machine translation).

Bay et al., SURF: Speeded Up Robust Features, Computer Vision: Ninth European Conference on Computer Vision, Graz, May 7-13, 2006, 14 pages.

Lowe, David G., Object Recognition from Local Scale-Invariant Features, Proc. of the Int'l Conf. on Computer Vision, Corfu, Sep. 1999, 8 pages.

* cited by examiner

METHODS FOR ENCODING A SOURCE COLOR ILLUSTRATION, FOR AUTHENTICATING AN ILLUSTRATION, AND RELATED COMPUTER MEDIA

CROSS-REFERENCE TO RELATED APPLICATIONS

This application is a national phase entry under 35 U.S.C. § 371 of International Patent Application PCT/FR2018/051761, filed Jul. 12, 2018, designating the United States of America and published in French as International Patent Publication WO 2019/020893 A1 on Jan. 31, 2019, which claims the benefit under Article 8 of the Patent Cooperation Treaty to French Patent Application Serial No. 1757021, filed Jul. 24, 2017.

TECHNICAL FIELD

The present disclosure relates to the field of authenticating an illustration.

BACKGROUND

Illustration is understood to mean any non-uniform graphical representation; e.g., a painting, a drawing, a photograph, etc.

For the sake of brevity, the case where the illustration is a photograph, particularly a portrait, will essentially be described here.

In this context, the present disclosure finds a particular application in the field of verifying identity documents, typically official identity documents (identity card, passport, driving license, etc.) or non-official identity documents (subscription card, etc.), where the illustration is a photograph of the identity document holder.

Indeed, the falsification of identity documents mainly concerns the replacement of the identity photo. While for a long time this replacement could be quite straightforward, it has become more complex in recent years with the use of "morphed" images.

"Morphed" image is understood to mean the image resulting from a morphological transformation or morphing between the original photograph of the legitimate holder of the identity document and that of a fraudster who wishes to use this identity document.

For a fraudster, the identity document undergoing manipulation is, for example, chosen so that the legitimate holder shares a certain number of morphological traits with the fraudster. This morphological resemblance between the legitimate holder and the fraudster facilitates the work of the forger who prints this morphing onto the identity document (leaving the other security elements intact), which makes it possible to deceive a visual and sometimes even automatic check, while remaining visually compatible with the other security elements of the identity document that echo the photograph, such as, for example, a ghost image, an image formed by punching holes, etc.

The objective of the present disclosure is therefore aimed at ensuring that the illustration, in this case the photograph on the identity document, is the original, i.e., it has not been manipulated in one way or another. It is therefore a question of authenticating the illustration, for example how it was on the day of manufacture of the identity document. It may furthermore serve to authenticate the holder of the document or the subject of the photograph. Accordingly, the present disclosure deals with photometry and not biometrics.

It obviously applies both to the field of security and to the field of art.

In the field of security, document US2015/0332136 is known, which is aimed at securing an identity photograph by surrounding this with a 2D barcode, the 2D barcode being based on alphanumeric data.

The present disclosure is aimed at providing an alternative and more secure solution.

BRIEF SUMMARY

More specifically, the present disclosure relates, according to a first of its objects, to a method for encoding a source color illustration, comprising steps consisting in:
  inscribing the source illustration in the form of an illustration inscribed in grayscale or in color,
  encoding a message in the form of a two-dimensional barcode comprising a set of blocks, each block coding a fragment of the message and comprising a set of (M) rows and (N) columns, and each block comprising a set of coding subblocks, each subblock comprising a set of bits.

It is essentially characterized in that the encoding step comprises preliminary steps consisting in:
  defining or identifying a set of distinctive points in the source illustration,
  calculating a set of attributes according to at least some of the distinctive points of the set,
  selecting, from among the set of calculated attributes, a set of at least one attribute making it possible to define a digital fingerprint,
  optionally compressing the digital fingerprint,
  optionally signing the digital fingerprint by means of a cryptographic signature, and
  recording in the message one among:
    a set of at least one attribute,
    the digital fingerprint,
    the compressed digital fingerprint,
    the uncompressed signed digital fingerprint, and
    the compressed and signed digital fingerprint; and
a step consisting in:
  encoding at least certain items of color information of the source illustration in the two-dimensional barcode.

In one embodiment, provision is furthermore made for at least one of the steps consisting in:
  inscribing the two-dimensional barcode on a destination medium;
  uniting the inscribed illustration and the destination medium;
  uniting the two-dimensional barcode with the inscribed illustration; and
  arranging the two-dimensional barcode in a predefined way with respect to the inscribed illustration, optionally by framing the inscribed illustration.

Thanks to this feature, it is possible, as described subsequently, to simultaneously scan, e.g., with a communicating object, all the information useful for verification.

In one embodiment, each coding block further comprises a set of non-coding subblocks the position of which is predefined, the method further comprising, for each coding block, steps consisting in:
  selecting a predefined set of coding subblocks,
  encoding on a set of at least one predefined non-coding subblock the result of applying an error-correcting code to the values encoded by the predefined set of coding subblocks.

A step may be provided consisting in:

digitizing the source illustration if the latter is not already in digital form; and either:
  decomposing the digitized source illustration into a set of areas, each area being defined:
    by a primitive, determined by a shape recognition algorithm, a biometric recognition algorithm or a color gradient; or
    by an edge detection algorithm; or
    by applying to the source illustration a static geometric grid having a predetermined shape, optionally that of a face, the grid comprising a set of areas; and
  associating with each area a respective color or item of color information; or:
  converting the, optionally dimensioned, digitized source illustration into the Hue Saturation Value space comprising a hue component and a saturation component; and
  compressing the items of color information of the source illustration in the hue space and in the saturation space by:
    decomposing the hue component and the saturation component into a set of respective areas, each area corresponding to a uniform set of pixels the hue and saturation of which, respectively, is uniform; and
    associating, with each area, a respective hue and saturation and recording them in a dictionary.

It may be provided that the step of selecting a set of at least one attribute making it possible to define a digital fingerprint comprises a step consisting in selecting a number of attributes greater than a threshold value recorded in a memory.

Provision may be made for a least one of the steps among:
  adding to the digital fingerprint data extrinsic to the source illustration;
  selecting a number of attributes higher than a threshold value recorded in a memory among the set of calculated attributes; and
  encoding at least certain colors or items of color information of the source illustration in the form of metadata of the barcode.

At least one of the steps may be provided consisting in, for each block:
  arranging the coding subblocks and non-coding subblocks so that:
    at least one row of the block comprises a set of two by two adjacent coding subblocks, the set being surrounded by a set of non-coding subblocks, and
    at least one column of the block comprises a set of two by two adjacent coding subblocks, the set being surrounded by a set of non-coding subblocks; and
  arranging the coding subblocks and non-coding subblocks so that:
    for at least one column comprising a set of coding subblocks, each non-coding subblock of the column encodes a respective result of applying a respective error-correcting code to the values encoded by the set of coding subblocks of the column,
    for at least one row comprising a set of coding subblocks, each non-coding subblock of the row encodes a respective result of applying a respective error-correcting code to the values encoded by the set of coding subblocks of the row.

According to another of its subjects, the present disclosure relates to a method for authenticating an illustration inscribed in grayscale or in color obtained from a source color illustration, comprising steps consisting in:
  digitizing with an optical sensor:
    an illustration inscribed in grayscale or in color, and
    a two-dimensional barcode encoded according to the present disclosure, and encoding a message and metadata;
  decoding the message of the two-dimensional barcode, and
  comparing the decoded message and the inscribed illustration.

Steps may be provided consisting in:
  in the inscribed illustration read by the optical sensor:
    defining or identifying a set of distinctive points in the inscribed illustration read by the optical sensor,
    recalculating a set of attributes depending on at least some of the distinctive points of the set,
    selecting, from among the set of recalculated attributes, a set of at least one attribute making it possible to define a digital fingerprint,
  comparing the value of the difference between the decoded attributes of the two-dimensional barcode and the recalculated attributes to a predetermined threshold value recorded in a memory, and
  optionally verifying the cryptographic signature.

Steps may further be provided consisting in:
  calculating a reconstructed illustration of the source illustration by extracting the message or metadata from the two-dimensional barcode and, on the basis of the extracted message or the extracted metadata, carrying out one of the sequences of steps A, B, C and/or D below, consisting in:
  A1. identifying a set of primitive among the metadata,
  A2. applying each primitive to the digitized inscribed illustration in order to recalculate each area of the digitized inscribed illustration and color each area with its associated respective color; and
  A3. merging the recalculated colored areas and the digitized inscribed illustration; or
  B1. defining a set of areas of the digitized inscribed illustration using an edge detection algorithm;
  B2. establishing a unique correspondence between each area of the source illustration and each area of the digitized inscribed illustration;
  B3. coloring each area of the digitized inscribed illustration with the color of the corresponding area of the source illustration extracted from the metadata; or
  C1. defining a set of areas of the digitized inscribed illustration by applying a static geometric grid having a predetermined shape, optionally that of a face, to the digitized inscribed illustration;
  C2. establishing a unique correspondence between each area of the source illustration and each area of the digitized inscribed illustration;
  C3. coloring each area of the digitized inscribed illustration with the color of the corresponding area of the source illustration extracted from the metadata; or
  D1. extracting from a dictionary the values of all of the classes in the hue space and in the saturation space,
  D2. re-composing the set of areas of the hue space and of the saturation space by decompressing the two-dimensional barcode,
  D3. optionally redimensioning the reconstructed illustration in the saturation space and in the hue space to the dimensions of the digitized inscribed illustration, D4. reconstructing the brightness component on the basis of the digitized inscribed illustration, or on the basis of the digitized source illustration, D5. calculating the brightness, hue and saturation components of the reconstructed illustration by combining all of the areas of the hue space and of the saturation space recomposed in step D2, and the brightness component reconstructed in step D4, D6. converting the brightness, hue and saturation components into red green blue values, and displaying the reconstructed illustration on a display screen;

the method optionally furthermore comprising a filling in step consisting in applying a restoration algorithm to the reconstructed illustration prior to the displaying step.

Finally, according to another of its objects, the present disclosure relates to a computer program comprising program code instructions for executing the steps of the method according to the present disclosure, when the program is executed on a computer.

Other features and advantages of the present disclosure will appear more clearly on reading the following description given by way of an illustrative and non-restrictive example and with reference to the appended figures.

BRIEF DESCRIPTION OF THE DRAWINGS

FIG. 9 illustrates the decoding of the 2D barcode of FIG. 8, FIG. 10 schematically illustrates a sequence of encoding the illustration of FIG. 1 into a 2D barcode, in which sequence each area of the illustration is defined by edge recognition.

DETAILED DESCRIPTION

Figure 1:
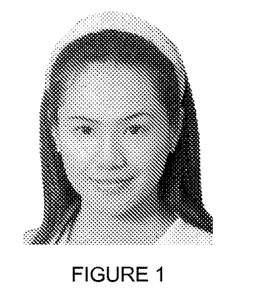
FIG. 1 illustrates a source illustration within the meaning of the present disclosure, in this case an identity photograph.

A source color illustration is shown in FIG. 1. In this case, the source illustration is an identity photograph, in particular intended for an identity document.

A step is first of all provided that consists in digitizing the source illustration if it is not already in digital form. For simplicity, hereinafter the source illustration or its corresponding digital file are understood to be interchangeable.

In order to be able to subsequently authenticate the source illustration and verify its integrity, i.e., that it has not been falsified, an encoding mechanism (described below) is provided.

Distinctive Points

A step is provided consisting in defining, or identifying, a set of distinctive points in the source illustration.

A distinctive point is defined as a point in the source illustration, i.e., a pixel or a set of two by two adjacent pixels, for which the contrast gradient, in a predefined direction and at a predefined distance, is greater than a predefined threshold value.

For example, a distinctive point is a printing point of an alphanumeric or kanji character. A distinctive point may also be purely graphical, i.e., non-alphanumeric, such as, for example, a point of the iris of an eye or a fixed point of the medium on which the source illustration is printed, for example a character of a serial number.

For a photograph of a person, distinctive points may be, for example, normal biometric elements such as the eyes, the nose, the corner of the lips, the center of the mouth, etc.

More generally, distinctive points may be graphical elements located in an environment with particular physical or mathematical characteristics (in image processing), such as, for example, graphical elements around which a steep gradient is formed, or which meet image processing criteria such as Stephen-Harris detectors. "Steep" gradient is understood to mean a gradient the value of which exceeds a threshold value.

Attributes

On the basis of the set of distinctive points, provision is made for a step consisting in calculating a set of attributes that contribute to the identifiable, or even unique, character of the source illustration. The attributes comprise a set of metrics, i.e., a set of distances or angles between certain distinctive points.

Attributes comprise, for example, the coordinates of distinctive points (with respect to a predetermined reference frame), the distances between certain distinctive points, contrast gradient values around the distinctive points, etc.

The position of a predetermined distinctive point of the source illustration in its representation context (e.g., in the frame depicted in FIG. 2), whether this position is random or imposed, may also be an attribute, for example, a distinctive point may be:

an edge of the source illustration, a biometrically calculated reference point, such as the center of gravity of the eyes or of the mouth.

Figure 3:
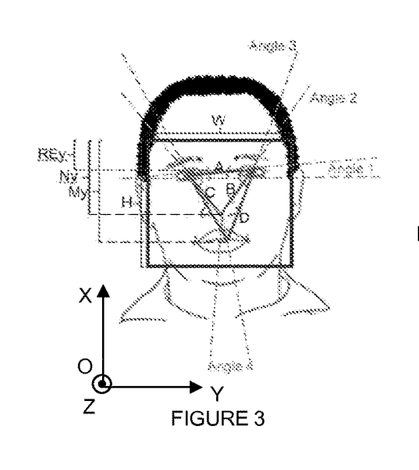
FIG. 3 illustrates metric attributes within the meaning of the present disclosure.

For a photograph of a person, attributes may be, for example, normal biometric elements such as distance ratios between the positions of the eyes, the nose, the corner of the lips or the center of the mouth, or angles between these same elements, etc. as illustrated in FIG. 3.

Attributes may be calculated thanks to standard biometric software for portrait illustrations.

For example, for a source illustration representing a portrait, the attributes may be calculated based on the morphology of the face (position of the eyes, the nose and the mouth) and on the orientation of the head at the time of taking the picture (head straight, slightly tilted to the left, slightly tilted to the right, etc.).

The SIFT ("Scale-Invariant Feature Transform") algorithm, or the SURF ("Speeded Up Robust Features") algorithm may also be used, both of which are local descriptors that consist, initially, in detecting a certain number of distinctive points in the image, for subsequently calculating a descriptor locally describing the image around each distinctive point. The quality of the descriptor is measured by its robustness to possible changes that an image may undergo, e.g., a change of scale and a rotation.

With regard to the SIFT algorithm, notably described in the publication by D. Lowe, Object recognition from local scale-invariant Features, IEEE International Conference on Computer Vision, pages 1150-1157, 1999, detecting points is based on the differences of Gaussians (DoGs) obtained by calculating the difference between each pair of images smoothed by a Gaussian filter, by varying the sigma parameter (i.e., the standard deviation) of the filter each time. The DoGs may be calculated for different scale levels making it possible to introduce the concept of scale space. Potential areas of points of interest/distinctive points are detected by searching for the extrema along the plane of the dimension of the image (x,y) and the plane of the scale factor. Then a filtering step is needed for removing non-relevant points, by eliminating, for example, the points whereof the contrast is too low.

The SIFT descriptor is calculated on an area around each point of interest, e.g., of 16×16 pixels, subdivided into 4×4 areas of 4×4 pixels. A histogram of the orientations of the gradient based on 8 intervals is then calculated on each of the 16 areas. The concatenation of the 16 histograms gives a descriptor vector of 128 values.

With regard to the SURF algorithm, notably described in the publication by H. Bay, T. Tuytelaars, and L. Van Gool, SURF: Speeded Up Robust Features, European Conference on Computer Vision, pages 404-417, 2006, the method consists in using the determinant of the Hessian matrix to calculate an approximation of the second derivatives of the Gaussians of the image via filters at different scales by using masks of different sizes (e.g., 9×9, 15×15, 21×21, etc.). For calculating the orientation of the points and the descriptors around the points, the principle is based on the sums of the responses of the horizontal and vertical Haar wavelets and their norms. The circular description area is again divided into 16 regions. A wavelet analysis is performed on each region in order to construct the final descriptor. The latter consists of the sum of the gradients in x and y and the sum of their respective norm for the set of 16 regions. The descriptor vector thus consists of 64 values that represent properties extracted both from normal space and from that of the scales of magnitude.

Preferably, a step is provided consisting in classifying the attributes according to an order of priority of probability, which makes it possible to select only the most effective for detecting a possible manipulation of the source illustration.

For example, the distance between both eyes of an adult human being is on average 63 mm, and generally between 58 mm and 72 mm. For a source illustration representing a portrait, if an attribute calculates that the distance between the two eyes is greater than a predetermined value, in this case 8 cm, or less than another predetermined value, in this case 5 cm, it may be provided that this attribute is rejected (not selected).

A step may therefore be provided consisting in selecting all or part of the calculated attributes.

Preferably, provision is made to select a number of attributes greater than a threshold value recorded in a memory. The more metrics there are (the higher the number of attributes) and the more different they are from each other, the less confusion there will be.

Fingerprint

Together, the selected attributes define a digital fingerprint of the source illustration.

Once the attributes have been selected, the digital fingerprint may then be recorded in a memory. In this case, the digital fingerprint is recorded in the form of a data vector in a temporary memory. Typically, the data vector comprises the values of the selected attributes, juxtaposed two by two.

A step may also be provided consisting in adding to the digital fingerprint data extrinsic to the source illustration, in particular data intrinsic to the environment with which the source illustration is united.

For example, for a source illustration such as a photograph in an environment such as a document, in particular an identity document, at least one of the datasets may be provided from among:
  data relating to the holder of the document and inscribed in the document, e.g., the surname, first name, height, date of birth of the holder, etc.; and which may facilitate checking the document,
  data relating to the document, e.g. information useful to the use of the document (validity date, scope of use, etc.) preferably the authenticity of which is proved by the cryptographic signature described later,
  metadata relating to the source illustration, for example, metadata relating to the colors of the source illustration, as described below;
  metadata relating to the document, for example:
    a classification, data originating from external databases, conditions of use, etc.;
    a "payload" such as a digital fingerprint, the iris scan of an eye, etc. of the holder of the document, represented in the form of a minutiae code; or else
  the date of creation of the source illustration or of creation of the 2D barcode described below.
  By convention, the term "fingerprint" therefore refers indiscriminately to the set of selected attributes and the set of selected attributes to which are added the data extrinsic to the source illustration.

Compression

The digital fingerprint is then preferably compressed to only represent a few bytes of information.

Signature

The optionally compressed digital fingerprint is then signed by means of a cryptographic signature, which makes it possible to prove that all this information has been issued by a trusted source.

Advantageously, provision is made to sign by means of a public key cryptographic signature, in particular, a compact one, preferably using cryptography on elliptic curves, e.g. according to the *Elliptic Curve Digital Signature Algorithm*, ECDSA.

This signature exploits the asymmetry between the private key and the public key and makes it possible to securely sign the digital fingerprint, while ensuring:
  first, that no one having the certificate is able to reproduce the signature of the digital fingerprint (and thus be able to cause it to be believed that the content is derived from a trusted source when it is not); and secondly, that anyone may verify the authenticity of the digital fingerprint and the identity of its signatory, by means of a safe key provided, for example, in an application on a communicating object (telephone, smartphone, tablet, laptop, etc.) fitted with an optical objective and with a display screen, or in ad hoc software.

2D Barcode

A step is provided consisting in encoding a message in the form of a two-dimensional barcode, or "2D barcode", represented by pixels.

The message comprises one from among:
a set of at least one attribute,
the digital fingerprint,
the compressed digital fingerprint,
the uncompressed signed digital fingerprint, and
the signed compressed digital fingerprint.

It may also be provided that the message further comprises:
a set of at least one distinctive point from which the attributes are calculated, which typically makes it possible to only calculate the fingerprint on only a portion of a source illustration.

The 2D barcode is then united with the source illustration, e.g. by printing on the medium of the source illustration, and, in particular, on a page of an identity document. The 2D barcode may also be printed in the form of a label glued to the medium of the source illustration. Other techniques may be implemented, e.g. by engraving or otherwise, as long as the 2D barcode can be recognized optically.

It is provided that the 2D barcode is arranged in a predefined way with respect to the source illustration, i.e., its shape is predefined, its dimensions are predefined and the relative position between the 2D barcode and the source illustration is also predefined.

In the field of art, if the source illustration is a painting, it may be provided that the 2D barcode is printed on the medium of the painting, e.g. a canvas, and preferably hidden by the frame thereof; if the illustration is a sculpture, it may be provided that the 2D barcode is printed or engraved on the base thereof.

Figure 2:
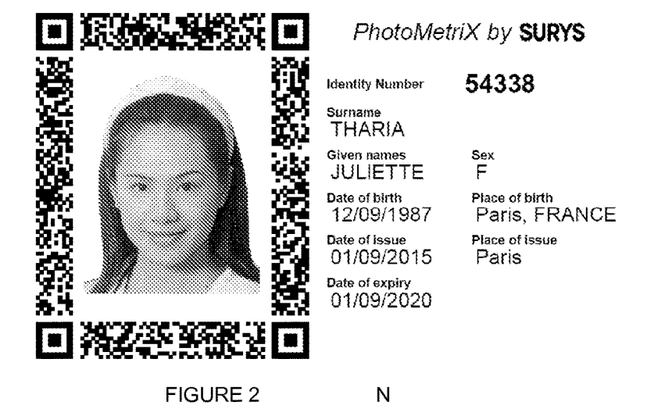
FIG. 2 illustrates an embodiment of a 2D barcode within the meaning of the present disclosure, surrounding the illustration in FIG. 1, and comprising extrinsic data within the meaning of the present disclosure.

It may be provided that the 2D barcode frames the source illustration, in this case the 2D barcode has a polygonal frame shape, and more particularly a rectangular frame, as illustrated in FIG. 2, which is advantageous in the field of security.

Preferably, the relative position of the illustration and of the 2D barcode framing it comprises a randomness of position and this relative position is an attribute, which makes it possible to further secure the digital fingerprint. Indeed, two identical illustrations (or the same source illustration) generate a first and a second almost identical 2D barcode. But thanks to the randomness of position, the relative position of the first 2D barcode and the relative position of the second 2D barcode is different. In particular, the randomness of position is a predetermined randomness and not a mechanical randomness due, for example, to manufacture.

Thus, in the field of security, it may happen that an identity document is lost and that the holder of the lost document has a new identity document made with the same photograph as that used for the lost identity document. In this case, as the position of the photograph on the new identity document is not exactly at the same position as on the lost identity document, then the corresponding attribute of the new document is different from the corresponding attribute of the lost identity document. It is thus possible to distinguish between two (otherwise identical) versions of the same document.

Typically, the 2D barcode is constructed within a set of guide markers. These guide markers make it possible to rectify both the source illustration and the 2D barcode via image processing. The number of guide markers may be adapted as a function of the target surface on which the source illustration is affixed/printed/inscribed/glued/displayed/etc. Indeed, the target surface may be flat but also cylindrical, conical, truncated cone shaped, etc. The elements to be rectified are included inside in order to ensure their optimal rectification.

For a flat target surface, as illustrated in FIG. 2, three or four guide markers are preferably provided surrounding the source illustration to be secured.

Encoding makes it possible to inscribe, in the immediate proximity of the source illustration and in a coded manner, security elements that will ensure easy verification by means of any communicating object or camera (including a webcam).

The immediate proximity of the source illustration and the 2D barcode ensures some security in that any alteration (intentional or not) of the source illustration risks damaging the 2D barcode and vice versa. Moreover, it enables the source illustration and the 2D barcode to be simultaneously read by an optical sensor.

Encoding Redundancy

The 2D barcode includes a certain number of redundancy properties of the message for avoiding difficulties in later reading. One possible implementation is the use of a correcting code, typically one of the codes from among:
a Hamming Code
a Golay Code
a Reed-Müller Code
a Goppa Code
a Xing Code, and
a Reed-Solomon Code.

One example of a method of encoding the 2D barcode consists in creating a plurality of blocks of M rows×N columns of bits each, with M and N both natural integers greater than or equal to 3.

Preferably M=N so as to obtain square blocks.

Depending on the length of the message, the message may be split into fragments, each fragment being encoded on a respective block. For brevity, message and fragment(s) will be considered alike.

The blocks may be distributed in various forms adapted to the medium used. For example, the blocks may be distributed in the background of a photograph or form a particular pattern. The only constraint is that they remain within the area covered by the guide markers or in their immediate proximity, in order to allow them to be correctly rectified.

In a coding block, a fragment is encoded over a set of "coding" bits the position of which is known and predetermined.

It is provided here that each coding block contains, in addition to the coding bits, a set of non-coding bits, different from the coding bits, and the position of which is also known and predetermined.

In this case, it is provided that each M×N block is organized into:
a set of coding subblocks, each coding subblock comprising a set of Mc×Nc coding bits; with Mc and Nc two natural integers such that Mc<M and Nc<N, in particular Mc=M/2 and Nc=N/2, and a set of non-coding subblocks, each non-coding subblock comprising a set of Mn×Nn non-coding bits; with Mn and Nn two natural integers such that Mn<M and Nn<N, in particular Mn=M/2 and Nn=N/2.

According to the present disclosure, each block therefore contains a set of subblocks of coding bits, and a set of subblocks of non-coding bits, the position of each subblock being known and predetermined.

Preferably, if M=N, it is then provided that Mc=Nc and Mn=Mn so as to also obtain square subblocks.

Preferably, Mc=Mn and Nc=Nn, so that the coding subblocks have the same size as the non-coding subblocks.

Figure 4:
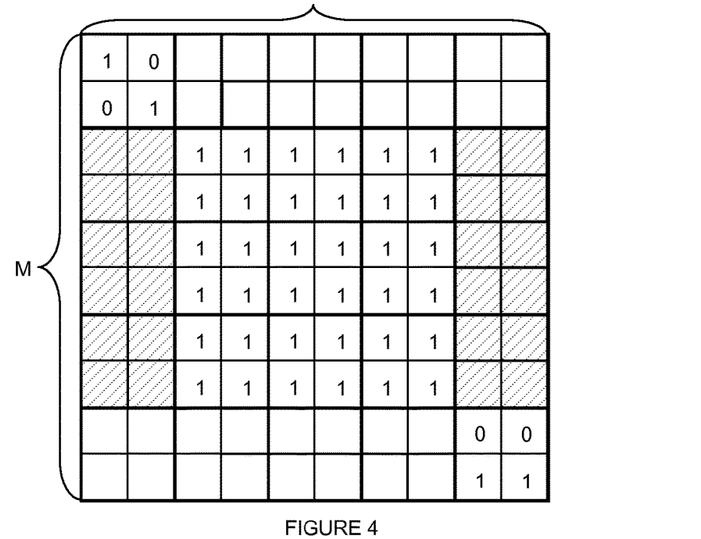
FIG. 4 illustrates an embodiment of a block within the meaning of the present disclosure.

For example, as illustrated in FIG. 4, Mc=Nc=Mn=Nn=2. Each block is therefore organized into subblocks of 2×2 coding or non-coding bits each, illustrated in bold lines in FIG. 4, and each encoding 4 bits or 2^4=16 values.

It is provided that at least one portion of the non-coding subblocks of a given block implements an error-correcting code, in this case a Reed-Solomon code, on the data encoded by at least one portion of the coding subblocks.

It may be provided that:
At least one of the non-coding subblocks is a synchronization subblock serving to resynchronize the block by means of a guide marker, e.g. a conventional code such as (1, 0, 0, 1) as illustrated in FIG. 4 for the subblock positioned at the top left of the block,
At least two of the non-coding subblocks are security subblocks preferably arranged diametrically opposite, which makes it possible to secure a central diagonal of the block by means of an error-correcting code, in this case a Reed-Solomon code and, for example, a Reed-Solomon Code RS(5,3) for a 5×5 block, which is illustrated by blank subblocks at the bottom left and top right of the 10×10 block in FIG. 4,
At least one of the non-coding subblocks is a numbering subblock making it possible to number the block (numbering from 0 to 15 in this case), which is useful in case of non-linear organization, and is illustrated by the subblock (0, 0, 1, 1) at the bottom right of the block in FIG. 4.

The numbering subblock may be replaced by a security subblock or other subblock.

Preferably, the synchronization subblock, the security subblocks and the optional numbering subblock are arranged at the 4 corners of the block, as illustrated in FIG. 4.

Preferably, it is provided for a block that:
at least one row of the block comprises a set of two by two adjacent coding bits (respectively a set of subblocks), the set being surrounded by a set of non-coding bits (respectively a set of subblocks), and
at least one column of the block comprises a set of two by two adjacent coding bits (respectively a set of subblocks), the set being surrounded by a set of non-coding bits (respectively a set of subblocks).

In particular, it may be provided that the set of non-coding subblocks of a given row implements an error-correcting code for the data coded by the set of coding subblocks of the row.

Similarly, it may be provided that the set of non-coding subblocks of a given column implements an error-correcting code for the data coded by the set of coding subblocks of the column.

Thus, each row and each column of each block enjoy a redundancy through an error correcting algorithm, e.g. a Reed-Solomon code.

In one embodiment, the coding subblocks are arranged at the center of the block and surrounded by the non-coding subblocks.

Thanks to this feature, each block comprises a correcting code in two simultaneous perpendicular directions, which makes it possible to limit the risk of scratches, most often linear, preventing the reading of a portion of the 2D barcode information.

In particular, it may be provided that each non-coding subblock of a given row implements a Reed-Solomon code RS(X,Y) of the coding subblocks of the row, with:
X the total number of subblocks (coding and non-coding) of the row, and
Y the number of non-coding subblocks of the row.

In this case, with a 10×10 block comprising 5 2×2 subblocks distributed in 3 coding subblocks and 2 non-coding subblocks, X=M/2, i.e. M=10; X=5 and Y=X−2=3. In this example illustrated in FIG. 4, there is therefore at least one row comprising 3 coding subblocks flanked by 2 non-coding subblocks each implementing a Reed-Solomon code RS(5,3).

Similarly, it may be provided that each non-coding subblock of a given column implements a Reed-Solomon code RS(X',Y') of the coding subblocks of the row, with:
X' the total number of subblocks (coding and non-coding) of the column, and
Y' the number of non-coding subblocks of the row.

In this case, with a 10×10 block comprising 5 2×2 subblocks distributed in 3 coding subblocks and 2 non-coding subblocks, X'=M/2, i.e. M=10; X'=5 and Y'=X'−2=3. In this example illustrated in FIG. 4, there is therefore at least one column comprising 3 coding subblocks flanked by 2 non-coding subblocks each implementing a Reed-Solomon code RS(5,3).

In this case, each block therefore comprises 5×5 subblocks, distributed in 3×3 central coding subblocks and in 16 peripheral non-coding subblocks. It is provided that the 3×3 central subblocks contain the message, represented by the set of values 1 in FIG. 4. The subblocks of the first row, of the last row, of the first column and of the last column of the block constitute the peripheral non-coding subblocks. Four peripheral subblocks constitute the corners of the block. The other subblocks constitute the central coding subblocks.

Once the 2D barcode has been encoded, it is united with the source illustration, e.g., by printing on the same medium as the latter.

In particular, it may be provided, for greater discretion and depending on the type of use, that the code is printed with an invisible ink, typically comprising UV or IR pigments, which allows it not to be visible, thus not to interfere with reading/viewing the source illustration in visible light, and still be able to be checked by checking under UV or IR lighting.

Encoding Color

The source illustration is in color. It may be directly united with its destination medium. It may also be transferred to its destination medium. In this case for example, a source illustration may be an identity photograph that is digitized, optionally redimensioned, then printed on a destination medium such as an identity document.

On its destination medium, the source illustration may therefore be in color or in grayscale, depending notably on the transferring method and the medium used (for example, grayscale laser engraving on polycarbonate, color printing on PVC, etc.).

Thus, by "inscribed illustration" what is interchangeably meant is:
the source color illustration per se, for example an identity photograph—in this case the destination medium is the printing paper;

the source color illustration united with its destination medium, for example an identity photograph on an identity document—in this case the destination medium is the identity document;

a copy of the source illustration on its destination medium, in grayscale or in color; for example, for an identity photograph printed or engraved on an official or unofficial identity document—in this case the destination medium may be anything, a copy of the source illustration displayed on a display screen, for example of a communicating object—in this case the destination medium is the display screen.

The source illustration may become an inscribed illustration (for example, for an identity document) then a reconstructed illustration (for example, during an inspection).

Preferably, provision is made to unite the inscribed illustration and the destination medium, for example, by printing, engraving, laser marking, adhesive bonding or any other uniting means (stapling, etc.).

Provision may be made for a step consisting in encoding at least certain items of color information of the source illustration in the 2D barcode. The expressions "color" and "item of color information" are therefore considered to mean the same thing.

Thus, even if the inscribed illustration is a grayscale illustration, the 2D barcode nevertheless encodes items of color information of the source illustration, this being particularly useful during the decoding, as explained below.

In the present case, provision is made to encode at least certain items of color information of the source illustration in the message, and, in particular, in the form of metadata, in the following way.

Provision is made to process the source illustration, the processing comprising a step consisting in decomposing, or dividing, the source illustration into a set of areas, and of associating with each area an item of color information, this allowing the information to be compressed.

Advantageously, provision is made to limit the number of areas, so as to limit the number of bytes of the message while preserving pertinent information on the color of the source illustration. It is therefore not a question of coding all of the pixels of the source illustration but of finding a compromise between significant information (for example, brown hair, blue eyes, etc.) and a relatively low, or even as low as possible, number of bytes for coding this color information.

Figure 8:
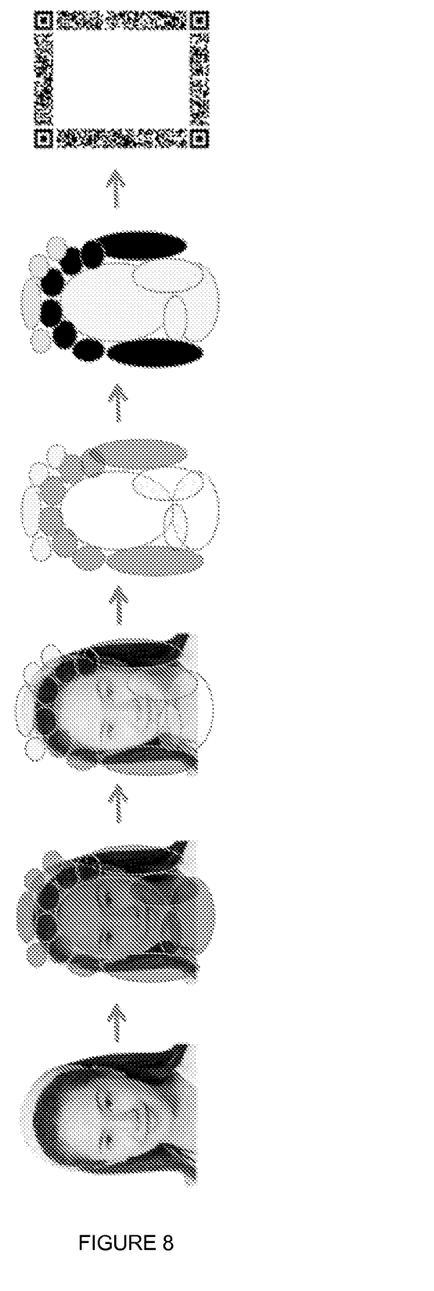
Figure 9:
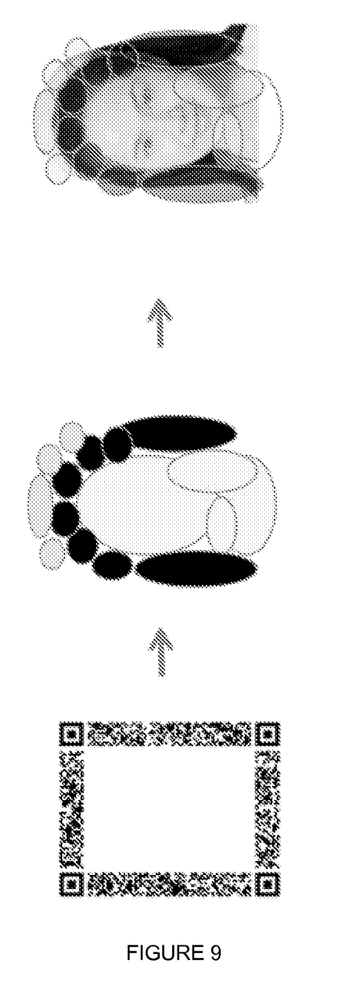
Figure 10:
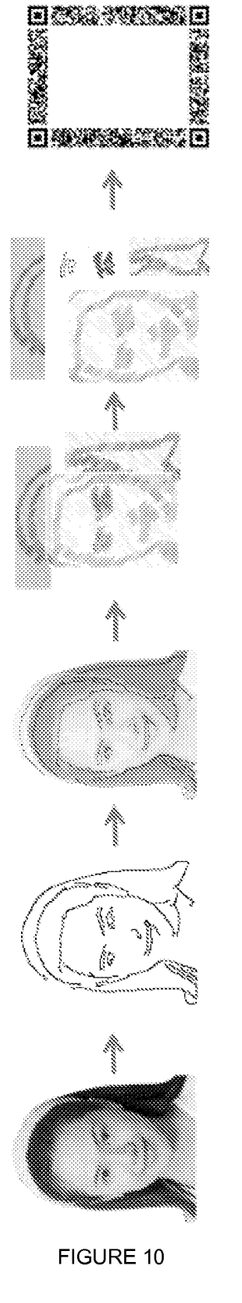

In a first variant of a first embodiment, which is schematically illustrated in FIG. 8, each area is defined by a primitive, for example determined by a shape recognition algorithm, a biometric recognition algorithm or a color gradient.

In a source illustration such as a face, it is thus possible to recognize, for example, the eyes, the hair, the shape of the face, etc.

Preferably, each area has a simple geometric shape, in the present case chosen among a set comprising:
circles,
ellipses,
polygons, and, in particular, rectangles.

The advantage of circles, ellipses and rectangles notably resides in the fact that they may be described, and therefore recorded as metadata, in the form of a limited number of shape descriptors, in the present case, respectively:
the coordinates of the center and the value of the radius of the circle,
the coordinates of the foci and the value of the constant of the sum of the distances to the foci, and
the coordinates of two opposite vertices;

this amounting to recording the type of shape and the position of each shape.

Thus, the type of metadata advantageously allows a corresponding type of primitive (circle, ellipse, rectangle, etc.) to be identified.

To each area then corresponds a single color, typically the average value of the colors of the area.

Provision may also be made for a combinatory step of decreasing the number of areas or primitives, this allowing the number thereof to be decreased and therefore a message that is less resource-intensive to encode to be obtained.

In a second variant of the first embodiment, each area is defined by detecting edges in the source illustration, for example using any one among a Prewitt filter, a Sobel filter and a Canny filter.

In this variant, provision is made to select only closed outlines, each closed outline corresponding to one area.

It is then possible to define (calculate) the position of the center of each area.

Advantageously, only the position of the center of each area may be recorded, and not the shape obtained by the edge detection, this also allowing a message that is less resource-intensive to encode to be obtained.

It is then possible to associate a single color with each defined area and to record the unique correspondence between an area and a color for all of the defined areas.

Preferably, provision is made to encode the type of encoding in the field of the metadata, for example one binary value corresponding to the first variant and the other binary value corresponding to the second variant.

Whatever the variant, provision may be made for a spectral analysis step to determine the average wavelength in each area, in order to determine one single color per area.

Each shape, i.e., the set of shape descriptors for the first variant and the coordinates of the center of each closed outline for the second variant, and the color associated with each shape may then be recorded, in the present case in the form of a string of characters in the field of the metadata.

In a third variant of the first embodiment, which is not illustrated, each area is defined C1 beforehand by applying a static geometric grid having a predetermined shape, in the present case that of a face, to the source illustration, which is optionally redimensioned to the dimensions of the grid.

It is then possible to establish C2 a unique correspondence between each area of the source illustration and each area of the digitized inscribed illustration; and to color C3 each area of the digitized inscribed illustration with the color of the corresponding area of the source illustration extracted from the metadata.

Figure 5:
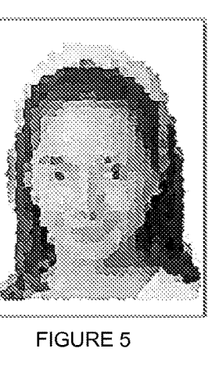
FIG. 5 illustrates the illustration of FIG. 1 after primitive decomposition into a set of areas, each area being colored a respective color.

Whatever the variant of the first embodiment, the processing also comprises a step consisting in then associating, with each area, a respective, preferably unique, color (FIG. 5), so as to create a set of solids.

In a second embodiment, provision may be made for, prior to the processing step described below, a preprocessing step comprising at least one of the steps among:
a step consisting in smoothing and in reducing the noise of the source illustration, for example by applying a median filter to the entirety of the digitized source illustration, this allowing the number of uniform areas in the illustration to be increased;
a step consisting in redimensioning the digitized source illustration, preferably while preserving the same ratio between the height and width thereof. Preferably, the dimensions (in units of length or in number of pixels)

to which the source illustration is redimensioned are predetermined, for example 50×64 (height×width) pixels.

Figure 14A:
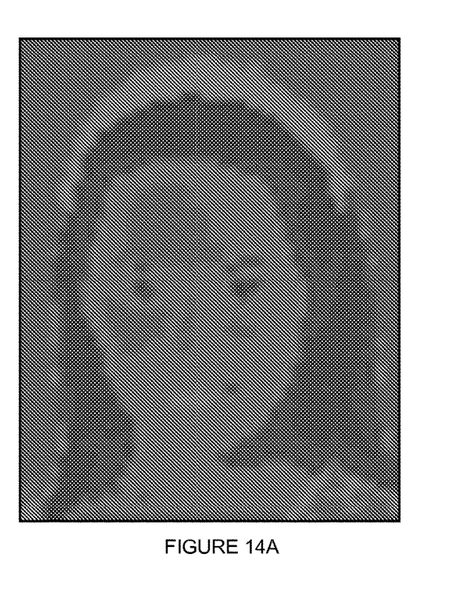
FIG. 14A illustrates the illustration of FIG. 1 digitized in the hue space.
Figure 14B:
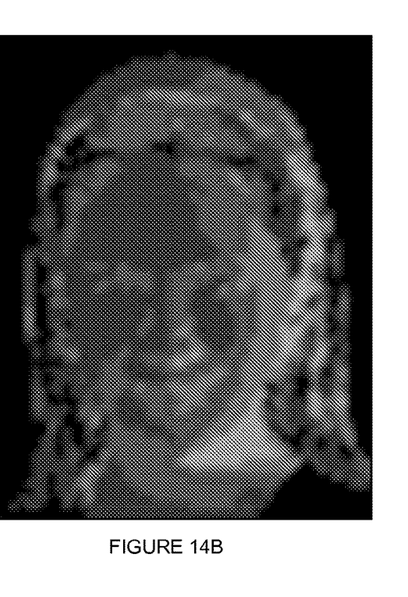
FIG. 14B illustrates the illustration of FIG. 1 digitized in the saturation space.

The processing of the source illustration comprises steps consisting in:

digitizing the source illustration using Red, Green, Blue (or RGB) coding;

converting the digitized source illustration into the Hue Saturation Value (or Hue Saturation Lightness) space, comprising a hue component, a saturation component and a value (or lightness) component, and recording in a memory, in the present case a temporary memory, at least the digitized source illustration in the hue space (FIG. 14A) and the digitized source illustration in the saturation space (FIG. 14B);

segmenting the digitized source illustration into a set of areas, each area corresponding to all of the so-called "uniform" pixels of the digitized source illustration the hue or saturation of which is uniform.

The Hue Saturation Value space is also called the HSV space. The hue corresponds to the color, the saturation corresponds to the purity of the color and the value corresponds to the brightness (or lightness) of the color.

In the present case, solely the hue component and the saturation component are recorded.

The segmenting step aims to segment, or partition, the n pixels (or points) of the digitized source illustration into k sets (or areas or classes) such that k≤n, by minimizing the distance between the points inside each area, the distance being calculated in the hue space and in the saturation space, and not in geometric space (X, Y positions of the pixels in the image).

Typically, the segmenting step is carried out by a machine learning classification algorithm, in the present case one that is unsupervised. In the present case, k-means partitioning is employed.

Each class is represented by the geometric center (centroid) of the class and comprises all of the pixels that are closest to one another in the hue space and in the saturation space.

A number of classes, for example K=5 classes, is defined beforehand and the same classification algorithm is applied for the hue component and for the saturation component. Therefore, a set of 5 classes is obtained in the hue space, which are, for example, denoted T1 to T5, and a set of 5 classes is obtained in the saturation space, which are, for example, denoted $S_1$ to $S_5$. Provision may also be made for the number of classes for the hue space to be different from the number of classes for the saturation space.

Each pixel P of the digitized source illustration may be classed at the end of the segmenting step into a single hue class and into a single saturation class. It is therefore possible to associate each pixel P with the class Ti (i∈[1; K]) to which the pixel belongs in the hue space and with the class Si (i∈[1; K]) to which the pixel belongs in the saturation space.

For example, it is possible to define:

$P_{X,Y}$ (T_$P_{X,Y}$) the hue value of the pixel P of coordinates X and Y; and $P_{X,Y}$ (S_$P_{X,Y}$) the saturation value of the pixel P of coordinates X and Y.

However, recording each value (T_$P_{X,Y}$) and (S_$P_{X,Y}$) for each pixel $P_{X,Y}$ would require too many resources.

Initially, provision is made to replace the coordinates of each pixel with the value of the centroid of its class, in the hue space and likewise in the saturation space.

Thus it is advantageously possible to define:

$P_{X,Y}$ (Ti) to be the hue value Ti of the geometric center of the class i (i∈[1; K]) into which the pixel P of coordinates X and Y has been classified, with 0≤Ti≤360; and $P_{X,Y}$ (Si) to be the saturation value Si of the geometric center of the class i (i∈[1; K]) into which the pixel P of coordinates X and Y has been classified, with 0≤Si≤100.

For example:

$P_{12,7}$ ($T_1$) means that the pixel of coordinates X=12 and Y=7 has been classified into hue component T1, and $P_{12,7}$ ($S_3$) means that the same pixel of coordinates X=12 and Y=7 has been classified into saturation component S3.

Next, provision is made to compress the data of each pixel of the digitized source illustration.

To compress the data, provision is made to scan the pixels in a predetermined scan direction, in hue space just as in the saturation space.

In the present case, provision is made to scan the digitized source illustration column by column, from left to right in columns of 1 pixel width, and from top to bottom along each column.

Instead of coding the hue value Ti of each pixel $P_{X,Y}$ along each column, which would require coding Y values, provision is made to code, in each column, a succession of at least one pair of values NTi, with N the number of consecutive pixels classed into the hue component Ti. Likewise, provision is made to code, in each column, a succession of at least one pair of values NSi, with N the number of consecutive pixels classed into the hue component Si.

Preferably, provision is made for a separator, in the present case a comma, to encode the passage from one column to the next, this avoiding the need to encode the column number.

For example, FIG. 1 shows a digitized source illustration of 50×64 pixels, i.e., 50 pixels per row and 64 pixels per column. In this case, X∈[1; 50] and Y∈[1; 64].

In the saturation space:

In the first column all the pixels are classified into the saturation component $S_1$. The pixels of the first column are therefore coded $64S_1$.

In the second column, the first 30 pixels are classified into the saturation component $S_1$, the following 20 pixels are classified into the saturation component $S_2$, and the remaining 14 pixels are classified into the saturation component $S_1$. The pixels of the second column are therefore coded $30S_1 20S_2 14S_1$. In this case, the second column is therefore solely coded with at most 6 values: 30, $S_1$, 20, $S_2$, 14 and $S_1$.

And so on for the following columns.

Similarly, in the hue space:

In the first column all the pixels are classified into the saturation component $T_1$. The pixels of the first column are therefore coded $64T_1$.

In the second column, the first 20 pixels are classified into the hue component $T_1$, the following 10 pixels are classified into the hue component $T_2$, the following 10 pixels are classified into the hue component $T_1$, and the remaining 24 pixels are classified into the hue component $T_3$. The pixels of the second column are therefore coded $20T_1 10T_2 10T_1 24T_3$. In this case, the second column is therefore solely coded with at most 8 values: 20, $T_1$, 10, $T_2$, 10, $T_1$, 24 and $T_3$.

And so on for the following columns.

As the values Ti and Si may be redundant columnwise, it is advantageous to store separately all of the values Ti and Si for i=1 . . . K, in the present case in the form of a dictionary.

In the above example, the two first columns are encoded in the following way:

$64S_1$, $30S_1 20S_2 14S_1$ in the saturation space, and
$64T_1$, $20T_1 10T_2 10T_1 24T_3$ in the hue space;

the values of $T_1$ to $T_5$ and of $S_1$ to $S_5$ being encoded separately.

The set of pairs of values NTi and all of the values Ti and Si are encoded into predefined positions of blocks of the 2D barcode as described above.

Decoding

Provision is made to perform an optical capture of the inscribed illustration, which is, for example, printed in grayscale, and the 2D barcode, thanks to an optical objective, preferably simultaneously. The inscribed illustration is thus digitized and recorded in a memory.

For example, the optical objective is that of a communicating object, the communicating object also comprising a memory. Alternatively, the optical objective may be a camera or a webcam connected to a computer and a memory.

A computer program for decoding described below is recorded in the memory.

A step is provided consisting in searching for the position of the guide markers, e.g. by the use of gradient detectors.

Once the guide markers have been identified, a step is provided consisting in rectifying the image included between the guide markers, e.g. by means of the Warp-Affine method in the OpenCV library.

Rectifying consists in reconstructing, despite a shooting angle that is sometimes non-orthogonal to the plane of the inscribed illustration, the set of the components of the 2D barcode as they would be found on a flat initial surface.

Then a step is provided consisting in matching the rectified image with a predetermined grid, which allows the reading of the pixels of the 2D barcode and the conversion thereof into a string of binary symbols.

The message may then be decoded, by passing these symbols to the inverse algorithm of the algorithm used for encoding.

The signature may then be verified to ensure that it is indeed an authentic content issued by the signatory authority. If this is not the case, the message may be rejected as non-authentic.

The characteristics of the digitized inscribed illustration, the data (attributes) and the metadata are extracted from the 2D barcode, preferably only once authenticity has been verified. These attributes extracted from the 2D barcode are then said to be "read."

In parallel (or in series) with the preceding operations, the inscribed illustration read by the optical sensor is processed to extract therefrom the same distinctive points and the same attributes of the source illustration as selected during the generation of the 2D barcode. These attributes extracted from the digital image of the inscribed illustration are then said to be "recalculated." In particular, all or part of the initially recorded distinctive points may be considered, depending on the desired confidence level.

Then a step is provided consisting in comparing the value of the difference between the read attributes and the recalculated attributes to a predetermined threshold value recorded in a memory.

Typically the difference between read attributes and the recalculated attributes is obtained by means of a set of metrics (typically ratios of distance or angles), e.g., Euclidean.

For example, as illustrated in FIG. 3, it is provided that:

a metric REy corresponds to the distance along the axis Oy, between the right eye and a predetermined fixed reference point, a metric Ny corresponds to the distance along the axis Oy, between the nose and a predetermined fixed reference point, a metric My corresponds to the distance along the axis Oy, between the mouth and a predetermined fixed reference point, a metric Angle2 corresponds to the angle between the pupils and the tip of the nose, etc.

By way of non-limiting example, the predetermined fixed reference point is, for example, an edge of the photo, a distinctive point of the face, in the present case on the forehead, etc.

If the distance between the read attributes and the recalculated attributes is below the threshold value, it is considered that the inscribed illustration digitized by the optical sensor actually conforms with the original source illustration, otherwise the inscribed illustration is considered as not being authentic.

Advantageously, this comparison may be implemented offline. It is therefore possible to verify the authenticity of a source illustration anywhere, thanks to a communicating object and without a network connection.

In the event that the digital fingerprint further comprises data extrinsic to the source illustration, the extrinsic data (e.g., card number, surname, first name, etc.) decoded from the 2D barcode may then be further displayed to a user on a display screen, and enable them to verify for themselves that it is indeed the information present on the document.

The metadata may also be used to check the features specific to the holder of the document, thanks to additional technical means (e.g., a fingerprint reader, an iris scanner, etc.). The source illustration (the photograph) thus authenticated may allow a biometric verification of the holder.

Decoding Color

When the 2D barcode encodes color, the source illustration may be inscribed in grayscale or in color on a medium. For example, the inscribed illustration is an identity photograph united with an identity document, the photograph showing the holder of the identity document.

The digitization of the 2D barcode and the inscribed illustration allow, via the decoding described below, the source illustration to be reconstructed (i.e., interchangeably decoded or recalculated) and the reconstructed illustration to be displayed, in particular, on the display screen of the communicating object; this may notably be useful in the field of security, for example for an inspection, typically carried out by comparing the reconstructed illustration with the inscribed illustration, with the document holder, or even with the original source illustration, for example for an on-line inspection of a digitized source image transmitted on-line.

If the inscribed illustration is a color illustration, then it is furthermore possible to compare the colors of the inscribed illustration and of the reconstructed illustration, this allowing an additional check to be made.

Provision is made to extract the metadata of the 2D barcode, for example to a temporary memory.

Preferably, provision is made to identify A1 the type of encoding (in the present case whether it was achieved with primitives or closed outlines).

For the first variant of the first color-encoding embodiment, corresponding to the type of encoding achieved with primitives, provision is made to identify each primitive, in the present case by virtue of the format of the metadata.

It is then possible to apply A2 each primitive to the digitized inscribed illustration.

Figure 6:
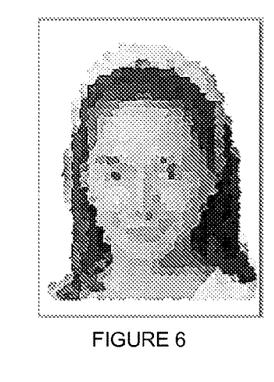
FIG. 6 illustrates an illustration recalculated and colored on the basis of the 2D barcode of FIG. 2.

It is then possible to recalculate each area and color each color with its associated respective color on the basis of the primitives and of the colors encoded in the metadata (FIG. 6).

Figure 7:
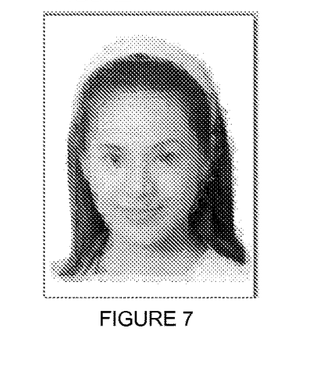
FIG. 7 illustrates the image resulting from the merger of the recalculated colored areas of FIG. 6 and the digitized inscribed illustration of FIG. 2, FIG. 8 schematically illustrates a sequence of encoding the illustration of FIG. 1 into a 2D barcode, in which sequence each area of the illustration is defined by a primitive.

Provision may then be made to display, on the display screen of the communicating object, the image resulting from the merger A3 of the recalculated colored areas and the digitized inscribed illustration (FIG. 7), merging techniques being known per se, this being particularly useful when the inscribed illustration is in grayscale.

For the second variant of the first color-encoding embodiment, corresponding to the type of encoding achieved with closed outlines, provision is firstly made to define B1 a set of areas of the digitized inscribed illustration using the same edge detection algorithm as that employed to encode the color.

Thus, the edge detection is therefore implemented a first time (on the source illustration, to encode the 2D barcode); and a second time (on the inscribed illustration, to decode the 2D barcode).

Therefore, there is a unique correspondence B2 between each area of the source illustration used to encode the 2D barcode and each area of the digitized inscribed illustration used to decode the 2D barcode. In this particular case, the position of the center of each area of the source illustration used to encode the 2D barcode is the same as the position of the center of each area of the digitized inscribed illustration used to decode the 2D barcode.

An inspection for falsification, based, for example, on comparison of the number of areas or on the position of the areas of the source illustration and of the areas of the inscribed illustration, may be carried out.

Figure 11:
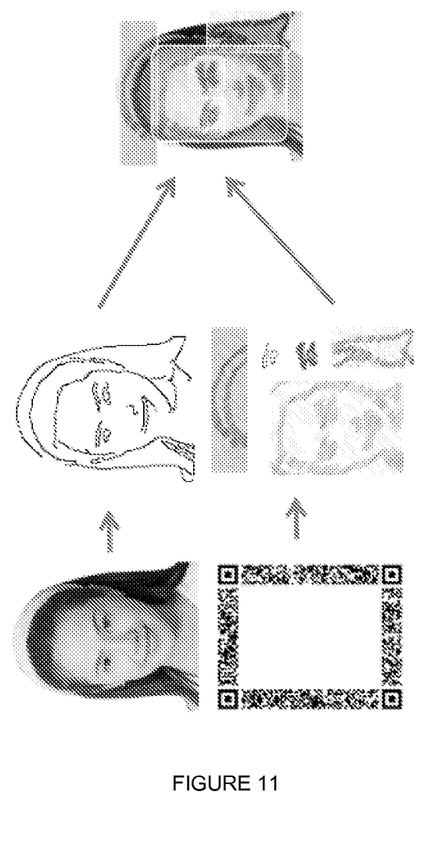
FIG. 11 illustrates the decoding of the 2D barcode of FIG. 10, FIG. 12A and FIG. 12B illustrate illustrations reconstructed by decoding the 2D barcode encoded with original portraits.

It is possible to calculate a reconstructed illustration of the source illustration with each area and each associated respective color (FIG. 11) by associating the color information of each area of the source illustration with each area of the digitized inscribed illustration; and, for example, to color B3 each area of the digitized inscribed illustration with the color of the corresponding area of the source illustration extracted from the metadata.

Typically, the color of each area of the digitized inscribed illustration is determined by the color of each corresponding area of the source illustration, the correspondence being determined by the identical position of the center of each area.

The display may also comprise a prior filling in step consisting in applying an inpainting algorithm to the reconstructed illustration, i.e., a technique for reconstructing deteriorated images or for filling in missing portions of an image, this making it possible to ensure a continuity between two artificial objects, and in the present case avoid having white spaces between two areas of color; or any other equivalent function capable of smoothing, or even removing, pixelization and/or zoning.

For the second color-encoding embodiment, provision is made to extract D1 from the dictionary the values of all of the Ti and Si.

Provision is also made to calculate a reconstructed illustration of the source illustration in the hue space and in the saturation space, by decompressing D2 the data compressed in the 2D barcode, this amounting to recomposing the set of (k) areas of the hue space and of the saturation space. To this end, the color information is extracted from the 2D barcode and the reconstruction is carried out in the hue space and in the saturation space. In the present case, the set of sequences of at least one pair of values NTi is extracted for each column. On this basis, the source illustration may then be reconstructed in the hue space. Similarly, the set of sequences of at least one pair of values NSi is extracted for each column. On this basis, the source illustration may then be reconstructed in the saturation space.

As the inscribed illustration has been digitized, provision may be made for a step D3 consisting in redimensioning the reconstructed illustration in the saturation space and in the hue space to the dimensions of the digitized inscribed illustration.

Provision may also be made to reconstruct D4 the brightness component on the basis of the digitized inscribed illustration, or optionally on the basis of the digitized source illustration, in a way known per se: if the inscribed illustration is in grayscale, the brightness component is directly extracted therefrom, and if the inscribed illustration is in color, then it is converted into grayscale by averaging the RGB values of the pixels in order to directly extract therefrom the brightness component.

Provision may be made to calculate D5 the brightness, hue and saturation components of the reconstructed illustration by combining all of the (k) areas of the hue space and of the saturation space recomposed in step D2, and the brightness component reconstructed in step D4.

Thus, three HSV components of same dimensions, corresponding to the digitized source illustration, are obtained. The three HSV components may then be converted D6 into RGB values and the result of this conversion may be displayed on the display screen, i.e., the reconstructed illustration with the colors determined from the 2D barcode may be displayed.

Thus, even if the inscribed illustration is in grayscale on its destination medium (for example, an identity photograph engraved by laser onto a medium made of polycarbonate), decoding the 2D barcode allows a reconstructed illustration of the source color illustration that was the origin of the inscribed illustration to be calculated.

It is thus possible to easily inspect certain aspects, for example the color of the eyes, of the skin, of the hair, etc. by comparing the displayed illustration and the holder of the identity document. It is also possible to detect whether the inscribed illustration has been altered. Specifically, in this case, the 2D barcode does not code exactly the same areas or the same colors. There is therefore a difference between the inscribed illustration and the displayed illustration, which then contains artefacts that are particularly visible.

Figure 12A:
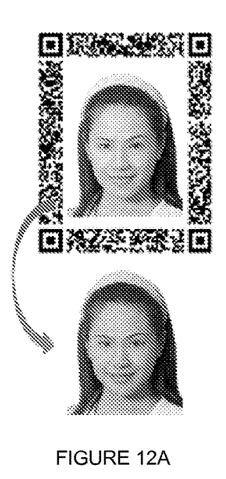
Figure 12B:
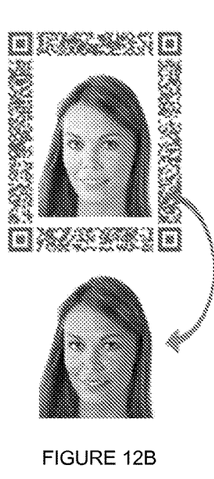
Figure 13A:
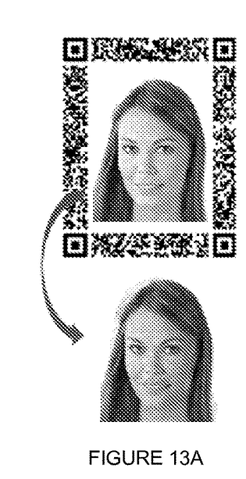
FIG. 13A and FIG. 13B illustrate illustrations reconstructed by decoding the 2D barcode encoded with original portraits—however, the illustrations in the figures were inverted subsequently to the encoding of the 2D barcodes.
Figure 13B:
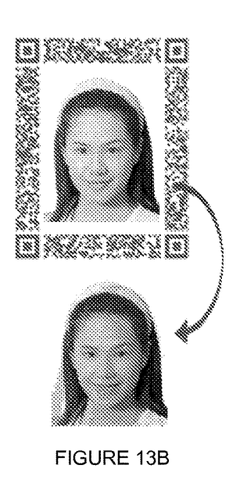

For example, FIG. 12A and FIG. 12B, respectively, illustrate the decoding of 2D barcodes the original source illustrations of that are the framed source illustrations. FIG. 13A and FIG. 13B, respectively, illustrate the decoding of 2D barcodes the source illustrations of which have been inverted: the 2D barcode of FIG. 13B corresponds to the source illustration of FIG. 12A and the 2D barcode of FIG. 13B corresponds to the source illustration of FIG. 12B. In this case, artefacts appear in the display of the reconstructed images, which are shown in the bottom portion of FIGS. 13A and 13B; for example, in FIG. 13B in the bottom left corner the shape of the hair of FIG. 12B may be seen. It is thus possible very easily and rapidly to conclude that the displayed illustration and the 2D barcode do not correspond, and that one thereof has probably been altered.

It is interesting to note that this method, which may be completely paperless, may cause traces of falsification to appear comparable to those that control officers, for example border control officers, are used to seeing in the inspection of physical documents. Hence the advantageousness of encoding color even when it is a question of inspection of a purely digital document (that is not subject to the constraints and limitations of printing techniques).

Advantageously, the message is extracted automatically.

The present disclosure makes it possible to authenticate the same source illustration at two distinct times, despite the inevitable damage in the life cycle thereof or of a document supporting it and whatever the nature of the media of the documents (physical or digital) to be inspected.

The present disclosure may also make it possible to authenticate that the copy of a source illustration is consistent with the original.

The present disclosure is not limited to the previously described embodiments. For example, it may be implemented in the field of authenticating registered trademarks, e.g. for authenticating that the trademark affixed to a product is actually the original trademark; for authenticating labels, in particular comprising a randomness of manufacture making it possible to characterize them, notably in the field of security or wines and spirits.

Accordingly, an illustration within the meaning of the present disclosure may be a graphic signature within the meaning of patent EP2526531 filed by the applicant.

The invention claimed is:

1. A method for encoding a source color illustration, the method comprising:
   inscribing a source color illustration in a form of an illustration inscribed in grayscale or in color;
   encoding a message in a form of a two-dimensional barcode comprising a set of blocks, each block of the set of blocks coding a fragment of the message and comprising a set of (M) rows and (N) columns, and each block of the set of blocks comprising a set of coding subblocks, each coding subblock of the set of coding subblocks comprising a set of bits, the encoding comprising:
      defining or identifying a set of distinctive points in the source color illustration, a distinctive point, of the set of distinctive points, being a pixel or a set of two-by-two adjacent pixels for which a contrast gradient, in one direction and at a predefined distance, is greater than a predefined threshold value;
      calculating a set of attributes according to at least some of the distinctive points of the set of distinctive points to form a set of calculated attributes;
      selecting, from among the set of calculated attributes, a set of at least one attribute to define a digital fingerprint; and
      recording in the message one among:
         the set of the at least one attribute;
         the digital fingerprint;
         the digital fingerprint as a compressed digital fingerprint;
         the digital fingerprint as an uncompressed signed digital fingerprint, fingerprint; and
         the digital fingerprint as a compressed signed digital fingerprint;
   with the source color illustration not already in digital form, digitizing the source color illustration to form a digitized source illustration;
   decomposing the digitized source illustration into a set of areas, each area of the set of areas being defined by:
      a primitive, determined by a shape recognition algorithm, a biometric recognition algorithm, or a color gradient;
      an edge detection algorithm; or
      applying to the source color illustration a static geometric grid having a predetermined shape, the static geometric grid comprising the set of areas;
   associating with each area, of the set of areas, a respective color or item of color information; and
   encoding at least one of the items of color information of the source color illustration in the two-dimensional barcode.

2. The method of claim 1, further comprising:
   inscribing the two-dimensional barcode on a destination medium;
   uniting the destination medium and the illustration inscribed in grayscale or in color;
   uniting the two-dimensional barcode with the illustration inscribed in grayscale or in color; and
   arranging the two-dimensional barcode in a predefined way with respect to the illustration inscribed in grayscale or in color.

3. The method of claim 2, wherein arranging the two-dimensional barcode in the predefined way with respect to the illustration inscribed in grayscale or in color comprises framing the illustration inscribed in grayscale or in color.

4. The method of claim 1, wherein each block of the set of blocks further comprises a set of non-coding subblocks the position of which is predefined, the method further comprising, for each block of the set of blocks:
   selecting a predefined set of coding subblocks of the set of coding subblocks; and
   encoding on a set of at least one predefined non-coding subblock, of the set of non-coding subblocks, a result of applying an error-correcting code to values encoded by the predefined set of coding subblocks of the set of coding subblocks.

5. The method of claim 4, comprising, for each block of the set of blocks, at least one of:
   arranging the coding subblocks, of the set of coding subblocks, and the non-coding subblocks, of the set of non-coding subblocks, so that:
      at least one row of the block comprises a set of two-by-two adjacent coding subblocks, the set of the two-by-two adjacent coding subblocks being surrounded by a set of the non-coding subblocks, and
      at least one column of the block comprises a set of two-by-two adjacent coding subblocks, the set of the two-by-two adjacent coding subblocks being surrounded by a set of the non-coding subblocks; or
   arranging the coding subblocks, of the set of coding subblocks, and the non-coding subblocks, of the set of non-coding subblocks, so that:
      for at least one column comprising a set of coding subblocks, each non-coding subblock of the column encodes a respective result of applying a respective error-correcting code, of the error-correcting code, to the values encoded by the set of coding subblocks of the column, and
      for at least one row comprising a set of coding subblocks, each non-coding subblock of the row encodes a respective result of applying a respective error-correcting code, of the error-correcting code, to the values encoded by the set of coding subblocks of the row.

6. The method of claim 1, further comprising at least one of:
   adding to the digital fingerprint data extrinsic to the source color illustration;

selecting, from the set of calculated attributes, a number of attributes higher than a threshold value recorded in a memory; or encoding at least one of the items of color information of the source color illustration in a form of metadata of a barcode.

7. A method for authenticating an illustration inscribed in grayscale or in color obtained from a source illustration, the method comprising:

digitizing, with an optical sensor, an illustration inscribed in grayscale or in color to provide an inscribed illustration;

digitizing, with the optical sensor, a two-dimensional barcode encoded using the method of claim 1, the two-dimensional barcode encoding a message and metadata;

decoding the message of the two-dimensional barcode to provide a decoded message; and comparing the decoded message and the inscribed illustration.

8. The method of claim 7, further comprising:

in the inscribed illustration digitized by the optical sensor:
defining or identifying a set of distinctive points in the inscribed illustration digitized by the optical sensor;
recalculating a set of attributes, to provide a set of recalculated attributes, depending on at least some of the distinctive points of the set of distinctive points; and
selecting, from among the set of recalculated attributes, a set of at least one attribute to define a digital fingerprint; and comparing a value of a difference between decoded attributes of the two-dimensional barcode and the recalculated attributes to a predetermined threshold value recorded in a memory.

9. The method of claim 8, further comprising verifying a cryptographic signature.

10. The method of claim 7, further comprising:

calculating a reconstructed illustration of the source illustration, the calculating comprising extracting the message or the metadata from the two-dimensional barcode to provide an extracted message or extracted metadata;
based on the extracted message or the extracted metadata, carrying out sequence A, sequence B, sequence C, or sequence D; and
displaying the reconstructed illustration on a display screen, wherein the sequence A comprises:
identifying a set of primitives among the metadata;
applying each primitive, of the set of primitives, to the inscribed illustration digitized with the optical sensor to recalculate each area of the inscribed illustration digitized with the optical sensor and to color each area with its associated respective color, providing recalculated colored areas; and
merging the recalculated colored areas and the inscribed illustration digitized with the optical sensor;

wherein the sequence B comprises:
using an edge detection algorithm to define a set of areas of the inscribed illustration, digitized with the optical sensor;
establishing a unique correspondence between each area of the source illustration and each area of the inscribed illustration digitized with the optical sensor; and coloring each area of the inscribed illustration, digitized with the optical sensor, with a color of a corresponding area of the source illustration extracted from the metadata;

wherein the sequence C comprises:
defining a set of areas of the inscribed illustration, digitized with the optical sensor, the defining comprising applying a static geometric grid having a predetermined shape to the digitized inscribed illustration;
establishing a unique correspondence between each area of the source illustration and each area of the inscribed illustration digitized with the optical sensor; and
coloring each area of the inscribed illustration, digitized with the optical sensor, with a color of a corresponding area of the source illustration extracted from the metadata; and wherein the sequence D comprises:
extracting from a dictionary values of all of classes in a hue space and in a saturation space;
re-composing a set of areas of the hue space and of the saturation space by decompressing the two-dimensional barcode;
reconstructing a brightness component on a basis of the inscribed illustration, digitized with the optical sensor, or on a basis of the source illustration to provide a reconstructed illustration;
calculating the brightness components, hue components, and saturation components of the reconstructed illustration by combining all of the areas of the hue space and of the saturation space recomposed in the re-composing act, and the brightness component reconstructed in the reconstructing act; and
converting the brightness components, the hue components, and the saturation components into red green blue values.

11. The method of claim 10, wherein:
the method comprises carrying out the sequence C; and
in applying the static geometric grid having the predetermined shape to the digitized inscribed illustration, the predetermined shape is that of a face.

12. The method of claim 10, wherein the method comprises carrying out the sequence D, the sequence D further comprising, after the re-composing and before the reconstructing:
redimensioning the reconstructed illustration in the saturation space and in the hue space to dimensions of the inscribed illustration digitized with the optical sensor.

13. The method of claim 10, further comprising, prior to the displaying act, applying a restoration algorithm to the reconstructed illustration.

14. A non-transitory computer readable medium comprising program code instructions for executing, on a computer, the acts of the method of claim 1.

15. The method of claim 1, wherein the encoding further comprises compressing the digital fingerprint to provide the compressed digital fingerprint.

16. The method of claim 1, wherein the encoding further comprises signing the digital fingerprint by way of a cryptographic signature.

17. The method of claim 1, further comprising:
converting the digitized source illustration into a Hue Saturation Value space comprising a hue component and a saturation component; and
compressing the items of color information of the source color illustration in a hue space and in a saturation space, the compressing comprising:

decomposing the hue component and the saturation component into a set of respective areas, each area of the set of respective areas corresponding to a uniform set of pixels, a hue and a saturation of the uniform set of pixels being, respectively, uniform; and associating, with each area, of the set of respective areas, a respective hue and saturation and recording the respective hue and saturation in a dictionary.

18. The method of claim 17, wherein converting the digitized source illustration into the Hue Saturation Value space comprise converting a redimensioned digitized source illustration into the Hue Saturation Value space.

19. The method of claim 1, wherein decomposing the digitized source illustration into the set of areas comprises defining the each area, of the set of areas, by applying to the source color illustration the static geometric grid having the predetermined shape, the predetermined shape being that of a face, the grid comprising the set of areas.

* * * * *

UNITED STATES PATENT AND TRADEMARK OFFICE
CERTIFICATE OF CORRECTION

PATENT NO. : 11,042,792 B2  
APPLICATION NO. : 16/633733  
DATED : June 22, 2021  
INVENTOR(S) : Marc Pic, Mohammed Amine Ouddan and Hugues Souparis Page 1 of 1

It is certified that error appears in the above-identified patent and that said Letters Patent is hereby corrected as shown below:

In the Specification  
        Column 3,     Line 16,     change "dimensioned" to --redimensioned--

In the Claims  
    Claim 1,     Column 21,     Line 57,     change "digital fingerprint, fingerprint; and" to --digital fingerprint; and--

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*